United States Patent
Nath et al.

(10) Patent No.: US 7,925,740 B2
(45) Date of Patent: Apr. 12, 2011

(54) SYSTEM AND METHOD FOR SERVICE QUALITY MANAGEMENT FOR WIRELESS DEVICES

(75) Inventors: Badri Nath, Edison, NJ (US); Rakesh Kushwaha, Marlboro, NJ (US); Peter Massam, Chalgrove (GB)

(73) Assignee: Mformations Technologies, Inc., Edison, NJ (US)

( * ) Notice: Subject to any disclaimer, the term of this patent is extended or adjusted under 35 U.S.C. 154(b) by 666 days.

(21) Appl. No.: 11/495,003

(22) Filed: Jul. 27, 2006

(65) Prior Publication Data

US 2007/0026854 A1 Feb. 1, 2007

Related U.S. Application Data

(60) Provisional application No. 60/703,807, filed on Jul. 28, 2005, provisional application No. 60/703,804, filed on Jul. 28, 2005.

(51) Int. Cl.
*G06F 15/173* (2006.01)
(52) U.S. Cl. ..... 709/224; 709/203; 709/217; 455/67.11; 455/67.14; 455/404.2
(58) Field of Classification Search .......... 709/244, 709/201–203, 217–219, 223–229; 455/67.11, 455/67.14, 404.2, 456.1, 456.2, 423; 370/252, 370/253; 714/47
See application file for complete search history.

(56) References Cited

U.S. PATENT DOCUMENTS

| | | | |
|---|---|---|---|
| 5,182,811 A | 1/1993 | Sakamura | |
| 5,694,451 A | 12/1997 | Arinell | |
| 5,774,377 A | 6/1998 | Eidson et al. | |
| 5,896,526 A | 4/1999 | Savkar et al. | |
| 6,076,113 A | 6/2000 | Ramanathan et al. | |
| 6,088,588 A | 7/2000 | Osborne | |
| 6,097,953 A * | 8/2000 | Bonta et al. .................. 455/436 |
| 6,182,157 B1 | 1/2001 | Schlener et al. | |
| 6,208,853 B1 | 3/2001 | LoVasco et al. | |
| 6,298,445 B1 | 10/2001 | Shostack et al. | |
| 6,343,213 B1 | 1/2002 | Steer et al. | |
| 6,466,804 B1 | 10/2002 | Pecan et al. | |

(Continued)

FOREIGN PATENT DOCUMENTS

AU 774777 B2 8/2001

(Continued)

OTHER PUBLICATIONS

Alessandro Rubini, "Linus Device Drivers", Feb. 15, 1998, Section 9, Interrupt Handling, O'Reilly Media, Inc., Sebastopol, CA.

(Continued)

*Primary Examiner* — Wing F Chan
*Assistant Examiner* — Ruolei Zong
(74) *Attorney, Agent, or Firm* — Lando & Anastasi, LLP

(57) ABSTRACT

A system and method for detecting and recording events related to the quality of service experienced by a wireless device in a wireless network. In one example, these events may be detected and recorded by the wireless device, without support from the network. Performance monitoring tests may be initiated by the wireless device at the direction of a management server, independent of the network in which the device may be operating. The wireless device may store the results of these tests and report the results to the management server.

19 Claims, 3 Drawing Sheets

U.S. PATENT DOCUMENTS

| | | |
|---|---|---|
| 6,577,628 B1 | 6/2003 | Hejza |
| 6,662,023 B1 | 12/2003 | Helle |
| 6,675,002 B1 | 1/2004 | Lipovski |
| 6,741,595 B2 | 5/2004 | Maher, III et al. |
| 6,842,861 B1 | 1/2005 | Cox et al. |
| 6,876,951 B2 | 4/2005 | Skidmore et al. |
| 6,879,813 B2 | 4/2005 | Reznik |
| 6,970,724 B2 | 11/2005 | Leung |
| 7,003,264 B2 * | 2/2006 | Fodor et al. ............... 455/67.11 |
| 7,043,254 B2 | 5/2006 | Chawla et al. |
| 7,076,252 B1 | 7/2006 | Hirvonen |
| 7,184,554 B2 * | 2/2007 | Freese ........................ 380/270 |
| 7,240,110 B2 * | 7/2007 | Haitsuka et al. ............. 709/224 |
| 7,386,299 B2 | 6/2008 | Nakamura |
| 7,437,168 B1 | 10/2008 | Westfield |
| 2002/0040450 A1 | 4/2002 | Harris et al. |
| 2002/0069037 A1 | 6/2002 | Hendrickson et al. |
| 2002/0069259 A1 | 6/2002 | Kushwaha et al. |
| 2002/0094799 A1 | 7/2002 | Elliott et al. |
| 2002/0112047 A1 | 8/2002 | Kushwaha et al. |
| 2002/0178385 A1 | 11/2002 | Dent et al. |
| 2003/0023857 A1 | 1/2003 | Hinchliffe et al. |
| 2003/0061009 A1 * | 3/2003 | Davis et al. ................. 702/189 |
| 2003/0208577 A1 | 11/2003 | Grigsby |
| 2004/0042604 A1 | 3/2004 | Hiltunen et al. |
| 2004/0058652 A1 | 3/2004 | McGregor et al. |
| 2004/0176040 A1 * | 9/2004 | Thornton et al. ........... 455/67.11 |
| 2004/0204089 A1 | 10/2004 | Castrogiovanni et al. |
| 2004/0207422 A1 * | 10/2004 | Lehtinen et al. .............. 324/758 |
| 2005/0059354 A1 * | 3/2005 | Zhao et al. .................. 455/67.11 |
| 2005/0060364 A1 | 3/2005 | Kushwaha et al. |
| 2005/0091553 A1 | 4/2005 | Chien et al. |
| 2005/0268118 A1 | 12/2005 | Zebelloni et al. |
| 2006/0015780 A1 | 1/2006 | Fong |
| 2006/0041652 A1 | 2/2006 | Cowham |
| 2006/0146713 A1 * | 7/2006 | Makowski et al. ........... 370/236 |
| 2006/0234639 A1 | 10/2006 | Kushwaha et al. |
| 2007/0030539 A1 | 2/2007 | Nath et al. |

FOREIGN PATENT DOCUMENTS

| | | |
|---|---|---|
| EP | 1355251 A2 | 10/2003 |
| EP | 1507425 A1 | 2/2005 |

OTHER PUBLICATIONS

Yuji Fukunaga, "Helping Tool for NT Network Operation," Interop Magazine, Mar. 1, 2000, pp. 103-113, vol. 10, No. 3.

Shinobu O'Hara, "Operation and Management Tool for Personal Computer LAN Successively Appearing on the Market," Nikkei Open System, Oct. 10, 1994, pp. 182-195, No. 19.

* cited by examiner

SYSTEM AND METHOD FOR SERVICE QUALITY MANAGEMENT FOR WIRELESS DEVICES

CROSS-REFERENCE TO RELATED APPLICATIONS

This application claims the benefit under 35 U.S.C. §119 (e) of U.S. Provisional Application No. 60/703,807 filed Jul. 28, 2005, entitled "DETECTING, MONITORING AND RECORDING HISTORY OF ATTEMPT FAILURES IN WIRELESS DEVICES" and U.S. Provisional Application No. 60/703,804 filed Jul. 28, 2005, entitled "A METHOD FOR MULTI-DOMAIN SERVICE QUALITY MANAGEMENT USING WIRELESS DEVICES," each of which is herein incorporated by reference in its entirety.

BACKGROUND

1. Field of Invention

The present invention is related to performance monitoring in wireless networks.

2. Discussion of Related Art

With the advent of wireless data networks, wireless devices are capable of establishing connections to communication nodes (e.g., Internet nodes) using a variety of different wireless networks, standards and protocols. Generally, such connections require that the communication nodes be identified (e.g., using an Internet Protocol (IP) address) and that appropriate communication protocols be used. However, even with the use of appropriate connection addresses and protocols, an attempt to make a connection, either from a wireless device to a destination node in a communication network or from a source node in a communication network to the wireless device, may fail for a variety of different reasons.

Conventional methods of monitoring the performance of wireless networks are generally based on a client-server approach in which both the client and the server are installed in the same domain. The term "domain" as used herein is intended to refer to a wireless network operated by one wireless operator. In such a conventional performance monitoring method, service monitoring is initiated by a server which sends instructions to the wireless device to conduct predefined tests. The server receives the results data from these tests and can use the data to monitor performance in the network domain. Any loss of connection during the test is considered a failure and such tests are ignored. This approach requires interaction between the wireless device and a fixed server. However, in wireless networks, the assumption that the two ends of the connection (device side and server side) are reachable at all times is not valid. Furthermore, data relating to failed attempts to establish a connection from the wireless device to the server are not measured with these tests.

Another drawback to the conventional client-server performance monitoring approach involves mobility. Wireless devices connect to different networks as the user moves. However, the servers which initiate the tests in conventional performance monitoring systems are fixed and are associated with specific domains and cannot operate across multiple domains. Therefore, performance data can only be collected by the server when the wireless device and the server are connected to the same network. When a user moves to a different network, the performance-monitoring server may not be accessible to the wireless device

SUMMARY OF INVENTION

In view of the limitations of conventional performance monitoring, there is a need for a service quality management system that may rely only on the wireless device itself, independent of any particular network. Accordingly, aspects and embodiments of the invention are directed to a system and methods for service quality management of wireless networks based on monitoring the service quality experienced by wireless devices, even when the devices may be disconnected from a network or roaming multiple networks. This device-based monitoring may allow for multi-domain service quality management because it may not require any tests or support to be initiated on the network side.

According to one embodiment, a method of determining quality of service provided by a network to a wireless device may comprise acts of detecting at least one network performance parameter, and recording, on the wireless device, information relating to the at least one network performance parameter. In one example, the wireless device may roam in more than one network and thus, detecting at least one network performance parameter may include detecting a first network performance parameter of a first network and detecting a second network performance parameter of a second network. In another example, the acts of detecting and recording may include detecting and recording the number of times an attempt to establish a connection between the wireless device and a network node fails. In addition, the act of recording may further include recording a state of at least one of the wireless device and the network at a time when the attempt to establish the connection fails. In one example, the information may be provided from the wireless device to a management server. The management server may also send a performance test command to the wireless device, which may authenticate the performance test command and parse the performance test command to determine a type of test to be conducted by the wireless device. In another example, detecting at least one network performance parameter may include detecting the at least one network performance parameter during a period in which the wireless device is not connected to the network. The network performance parameter may include, for example, a type of service coverage (e.g., voice and/or data) that may be available. Further, in another example, the act of recording may include an act of indexing the information with at least one of a location stamp indicative of a location of the wireless device and a local time stamp indicative of a time of detection of the at least one network performance parameter.

According to another embodiment, a system for network service quality management is provided. The system may comprise a wireless device capable of establishing a connection with a target server in a network, and a device agent constructed and arranged to interface with software on the wireless device to detect and record performance data relating to the network. The performance data may include, for example, a number of connection attempt failures between the wireless device and the target server. In one example, the system may further comprise a management server capable of communicating with the device agent and which may provide a performance test command to the device agent. The performance test command may include instructions for the device agent to conduct a test to detect the performance data and/or may specify details of a trap to be installed on the wireless device by the device agent to detect the performance data. The device agent may also provide the recorded performance data to the management server.

Another embodiment of the invention is directed to a system for service quality management in wireless networks. The system may comprise a management server, a wireless device capable of establishing a connection to the wireless networks, and a device agent coupled to the wireless device and constructed and arranged to receive instructions from the management server, to conduct a performance test based on the instructions, to store, on the wireless device, test results from the performance test, and to provide the test results to the management server. The performance tests may include detecting at least one service event (such as a failure to establish a connection between the wireless device and a node in one of the wireless network) in at least one of the wireless networks.

BRIEF DESCRIPTION OF THE DRAWINGS

Various aspects and embodiments of the invention are discussed below with reference to the accompanying drawings. These drawings are not intended to be drawn to scale. In the drawings, each identical or nearly identical component that is illustrated in various figures is represented by a like reference numeral. For purposes of clarity, not every component may be labeled in every drawing. In the drawings.

DETAILED DESCRIPTION

Figure 1:
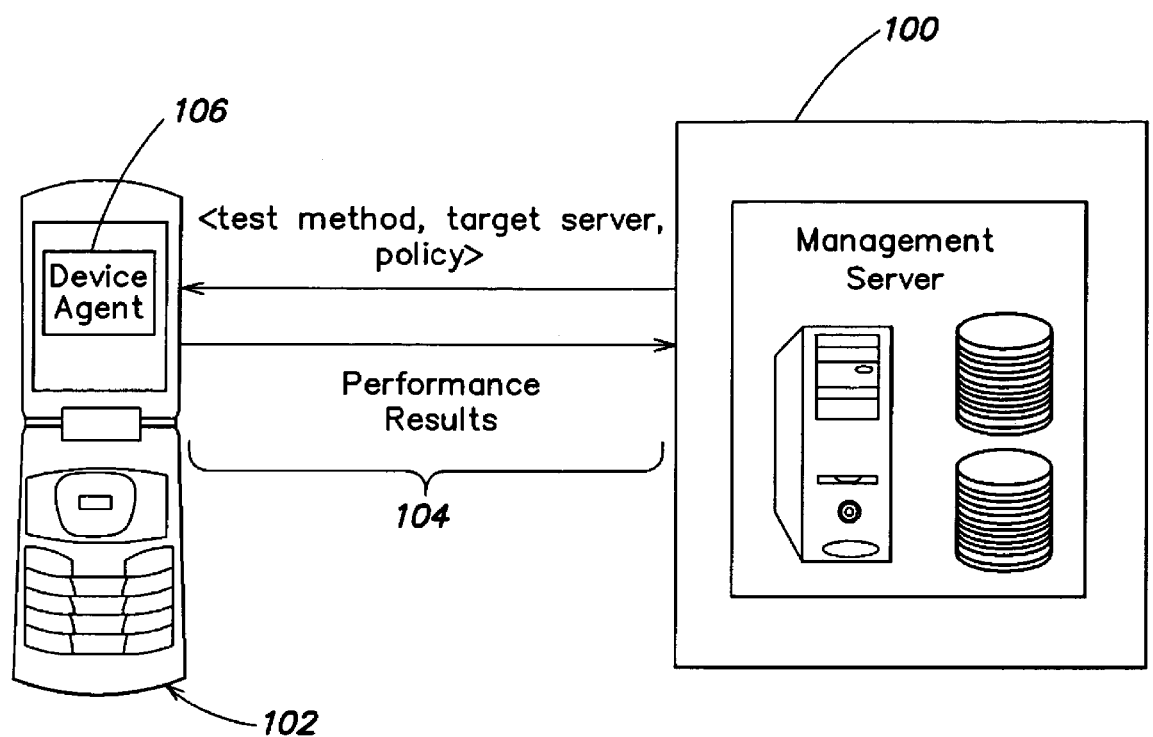
FIG. 1 is a block diagram of one example of a system for monitoring quality of network service according to one embodiment of the invention.

Embodiments of the invention, and aspects thereof, are directed to a system and methods for service quality management of wireless networks that may use device-based measurements to measure and collect performance data independent of any particular network. Such a system may depend only on the wireless device by measuring performance parameters that can be determined by the wireless device alone, without requiring input or support from a network. Thus, unlike conventional systems that require interaction between a wireless device and a server connected to the same network and thus only function in a single domain, device-based monitoring according to aspects of the invention may allow for multi-domain service quality management, as discussed below. In addition, because monitoring of service quality may occur at the wireless device, the wireless device may capture event data pertaining to device-initiated connection attempt failures that may not otherwise be visible in the domain. In particular, some embodiments of the invention may provide a mechanism for detecting and recording connection attempt failures while also capturing the state of the wireless device and/or the network when such a failure occurs, as discussed below.

It is to be appreciated that the invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only and are not intended to be limiting. In particular, acts, elements and features discussed in connection with one embodiment are not intended to be excluded from a similar role in other embodiments. Also, the phraseology and terminology used herein is for the purpose of description and should not be regarded as limiting. The use of "including," "comprising," "having," "containing," or "involving," and variations thereof herein is meant to encompass the items listed thereafter and equivalents thereof as well as additional items.

Referring to FIG. 1, there is illustrated a block diagram of one example of a system for monitoring quality of service according to an embodiment of the invention. The system may comprise a management server 100 and a wireless device 102 that may communicate over a communication link 104. In many embodiments, the communication link 104 may include a wireless link between the wireless device 102 and the management server 100. However, the wireless device may also "dock" to the management server to communicate with the management server. Thus, it is to be appreciated that the communication link 104 may include any suitable transmission media by which the wireless device 102 may communicate with the management server 104 including, but not limited to, copper wiring, optical fiber network links, electromagnetic radiation, etc. It is further to be appreciated that the term "wireless device" as used herein refers to any electronic wireless device that is capable of communicating with another electronic device over a network that includes at least one wireless link. Examples of wireless devices include, but are not limited to, cellular telephones (cell phones), personal digital assistants (PDAs), MP3 players or other music and/or video players, personal computers (e.g., laptops), etc. Thus, although the wireless device 102 is illustrated in FIG. 1 as a cell phone, the invention is not so limited and the wireless device may be any type of wireless device, including those mentioned above.

In accordance with the present invention, the system may provide a mechanism for detecting and recording wireless network service performance metrics, including, but not limited to, connection attempt failures, dropped calls, latency, throughput, packet loss, signal strength, etc. The metrics chosen to be measured may be indicative of the quality of service provided to the wireless device by the wireless network. Such service performance metrics may be detected and measured by the wireless device 102 and reported to the management server 100, as discussed further below. The management server may not be associated with any particular domain and therefore, may receive performance data from any network in which the wireless device may be operating. In one embodiment, the wireless device may conduct tests and record performance data based on a policy set by the management server. The policy may be communicated to a device agent 106 that may be loaded onto the wireless device (or may be in communication with the wireless device), and the device agent 106 may interface with device software to implement the policy.

It is to be appreciated that the term "device agent" as used herein refers to a software program capable of interfacing with other software programs on the wireless device to effect service quality tests and to monitor and record events related to service quality, such as, for example, connection attempt failures and dropped calls. Using the device agent 106, the wireless device 102 may be instructed to conduct performance experiments, store performance data, and communicate the results of such performance experiments to the management server 100. In one embodiment, the device agent may be installed on the wireless device itself. This installation may be accomplished in numerous ways. In one example, the device agent may be installed when a new wireless device is initiated either at the factory or by a service provider prior to being sold to a customer. Alternatively, the device agent may be installed on a wireless device by downloading the device agent at any time during the usable life of the wireless device.

In another embodiment, the device agent may be installed on an Identity Module attached to the wireless device. The term "Identity Module" as used herein refers to any type of electronic module (e.g., a smartcard) that contains a globally unique identifier (frequently termed an International Mobile Subscriber Identity) that uniquely identifies the Identity Module, and which enables a wireless device to which it is attached to communicate with wireless communication networks throughout the world. A more detailed discussion of examples and operation of an Identity Module is contained in commonly-owned, copending U.S patent application Ser. No. 10/886,005, entitled "SYSTEM AND METHOD FOR OVER THE AIR (OTA) WIRELESS DEVICE AND NETWORK MANAGEMENT" and filed on Jul. 7, 2004, which is herein incorporated by reference in its entirety. For the sake of simplicity, the following discussion will refer to the device agent as being located on the wireless device itself. However, it is to be appreciated that the device agent may also be located on an Identity Module, or similar electronic module, that is coupled to the wireless device.

According to aspects and embodiments of the invention, service quality may be monitored in a variety of ways. In one example, the device agent may be instructed by the management server to conduct specific tests to monitor attributes and/or connection attempt failures in one or more network domains, as discussed further below. In another example, the management server may instruct the device agent to set software traps that may execute in response to predetermined service conditions, such as a dropped call or connection attempt failure. It is to be appreciated that the term "trap" as used herein refers to a software interrupt which, when triggered, alerts the device agent to implement recording of specified information (e.g., the state of the wireless device and/or network, the date and time of the trigger event, the type of trigger event, the location of the wireless device (either a physical geographic location or a relative location within the network) at the time of occurrence of the trigger event, etc.). Using either or both of these methods, the wireless device may automatically create a log of such service-related events which may be collected by the management sever and used, for example, for diagnostics, remediation, service quality improvement, fraud activity detection, tamper detection, etc. In one embodiment, the wireless device 102 may be capable of storing service quality information even when the wireless device is out of coverage or disconnected from the management server 100. This information may then be reported to the management server when the wireless device becomes reconnected. Thus, any degradation in service may be captured in real time, stored on the wireless device 102, and communicated to the management server 100 when the connection 104 is reestablished, as discussed further below. Further, monitoring of service quality metrics may be done automatically by the wireless device without requiring support or initiation by the network domain to which the wireless device may be connected at any given time.

Figure 2:
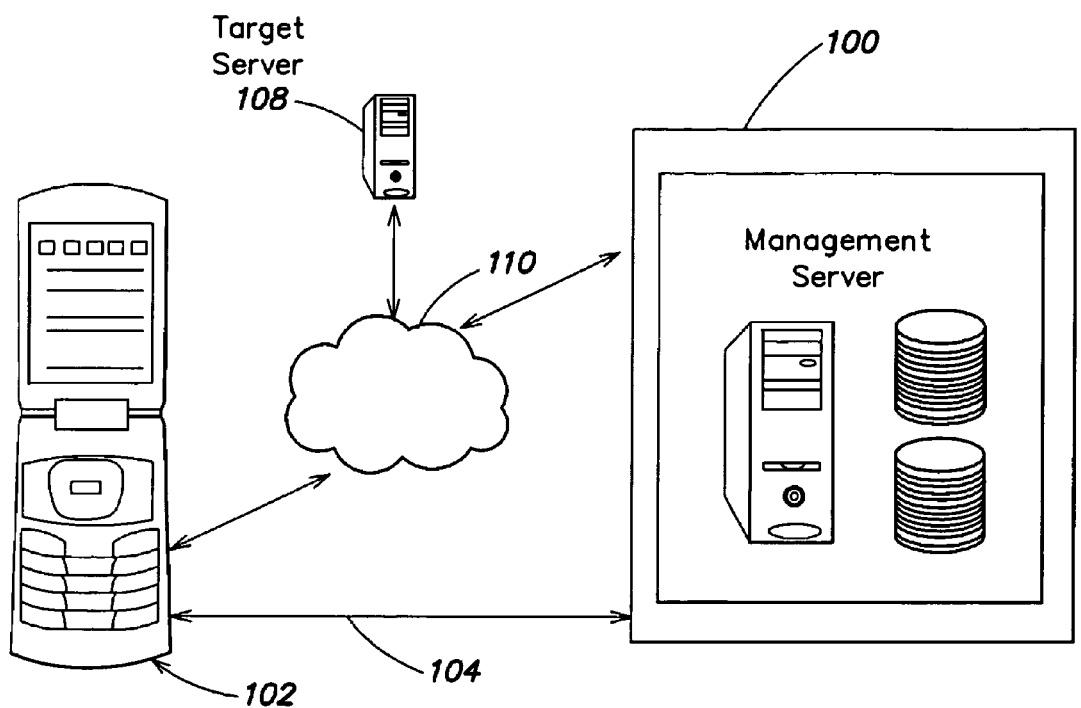
FIG. 2 is a block diagram of a network environment in which a wireless device may monitor and record service quality according to aspects of the invention.

Referring to FIG. 2, there is illustrated a block diagram of one example of an environment in which the wireless device 102 may monitor service quality and conduct service performance tests. As discussed above, the wireless device 102 may communicate with the management server 100 via communication link 104. The wireless device may also communicate with a target server 108 via a network domain 110, for example, to make phone calls to other wireless devices, to download or upload data, etc. Based on instructions from the management server 100, the device agent (not shown) may control the wireless device 102 to detect, monitor and record metrics that provide an indication of the quality of service provided by network domain 110.

Figure 3:
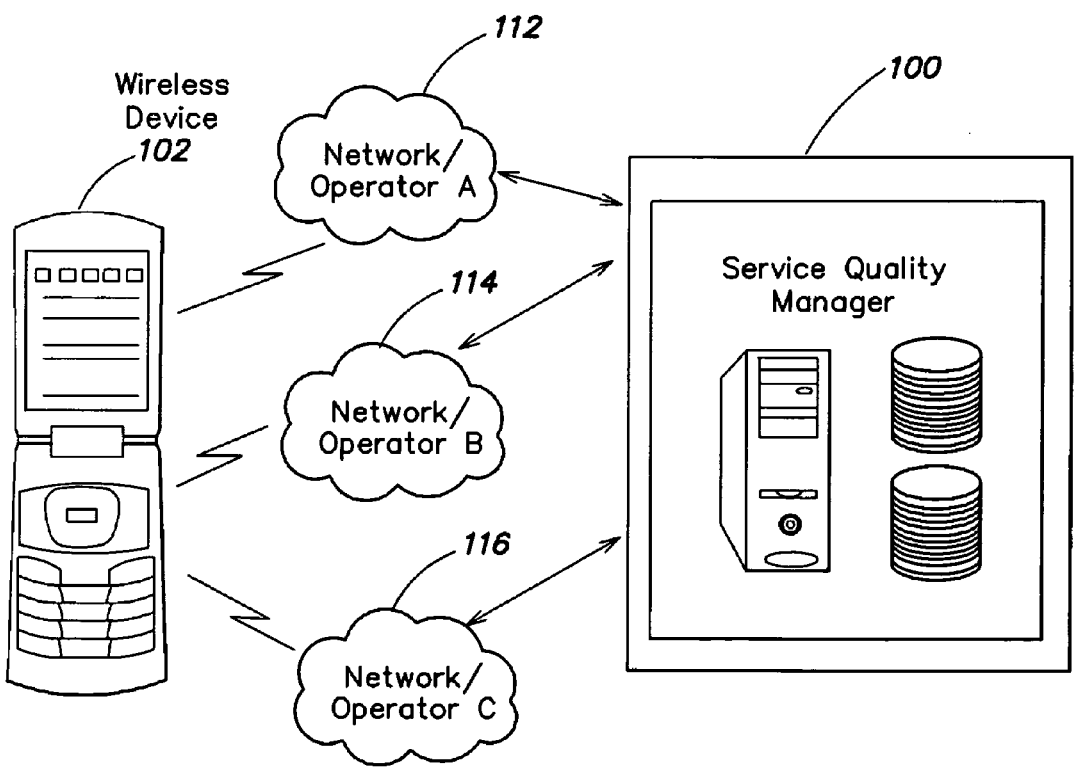
FIG. 3 is a block diagram of another example of a network environment in which the device may monitor and record service quality of multiple network domains according to aspects of the invention.

It is to be appreciated that the principles of the invention may be extended to multiple different network domains 110 and corresponding target servers 108. This is illustrated in FIG. 3 which shows the wireless device 102 coupled to multiple network domains 112, 114 and 116. The wireless device 102 may move and, as it does so, connect to different network domains that may be operated by different network operators. As discussed above, conventional client-server based monitoring approaches which rely on network-initiated tests only operate in a single domain. By contrast, with device-based performance tests according to aspects of the invention, as the wireless device 102 roams among different network domains 112, 114, 116, the wireless device may monitor and record service quality metrics for each network domain. The wireless device 102 may store these metrics (along with a network identifier) and report them to the management server 100, as discussed below.

According to one embodiment, the management server 100 may send performance test commands to the device agent 106. These performance test commands may specify the details of experiments to be performed by the wireless device 102 and/or details of traps to be set by the device agent. For example, a performance test command may indicate the type of test to be conducted (i.e., which performance metrics the test aims to measure), an identity of a target server, the amount of time or resources that may be used for the test, a policy that may specify the conditions under which the test is to be conducted, and a performance record format for reporting the results of the test to the management server. The device agent may implement the test by activating appropriate device components to initiate a connection to the specified target server, conduct the test specified in the command, record the results in a performance record, and communicate the performance record to the management server. In one embodiment, the performance test command may specify a "synthetic transaction" to be implemented by the wireless device. A synthetic transaction may contain details about a connection that is to be established for the sole purpose of measuring performance. However, in another embodiment, the performance test command may specify service quality-related information that is to be collected by the wireless device during the course of normal operation of the wireless device.

Figure 4:
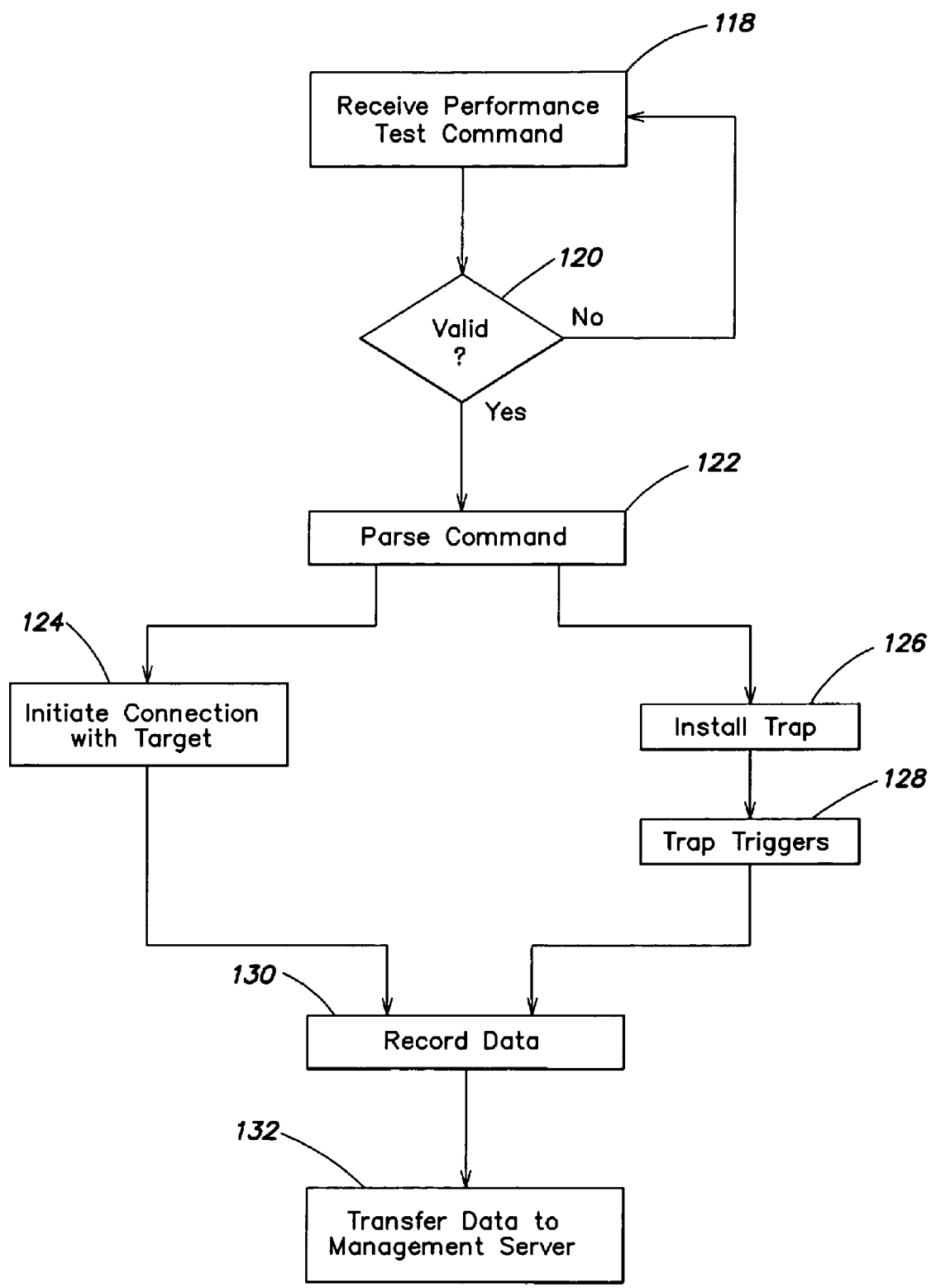
FIG. 4 is a flow diagram of one example of a method of service quality management according to an embodiment of the invention.

Referring to FIG. 4, there is illustrated a flow diagram of one example of a method of service quality measurement according to an embodiment of the invention. In a first act 118, the device agent may receive a performance test command from the management server. In one embodiment, the device agent may accept the performance test command only after authenticating the management server in act. 120. This may be a security feature to prevent unauthorized access to device functions and data, or to ensure that recorded performance data is sent only to the correct management server. Authentication may be done, for example, using a signature or identity code. The device agent may be programmed with one or more unique identity codes or signatures that identify trusted management servers from which the device agent may accept performance test commands. The code or signature may then accompany the performance test command to allow the device agent to recognize that the performance test command comes from a trusted management server. If the device agent cannot verify the performance test command, it may reject the command and wait to receive a new command.

After receiving a valid performance test command from the management server, the device agent may parse the command to determine the actions to be taken (act 122). As discussed above, the performance test command may include details of the test methodology. For example, in the case of a synthetic transaction, the performance test command may specify the target server, the type of test to be conducted (e.g., which service quality metric the test aims to measure), the amount of data to be transferred during the test session, the time of the test session etc. Thus, the device agent may parse the performance test command to receive all the details of the test so as be able to set up the test procedure.

According to one embodiment, the performance test command may specify a policy under which tests are to be performed. For example, the policy may specify that tests are to be conducted periodically, on a one-time basis (e.g., once per command received) or based on a threshold condition that can be detected by the wireless device. The policy may similarly specify conditions under which the device agent is to provide the performance records to the management server. In addition, the policy may specify wireless device and/or network conditions under which a test should be conducted or that may trigger execution of a trap. For example, the policy may specify that tests may be conducted based on the state of the wireless device, the state of the network, and/or previously measured performance data. The device state may include the wireless device details, such as its internet protocol (IP) address or other identifier, device capabilities, and device conditions, such as application inventory (e.g., what programs and applications are loaded on the device), signal strength, battery, time-of-day, etc. The network state may include, but is not limited to, network details (e.g., type of network such as Wi-Fi, Bluetooth, Radio Frequency), network identity, signal strength, network condition (e.g., whether the wireless device is roaming or in a home network), a geographical location of the wireless device, and a relative location of the wireless device in the network (e.g., the distance of the wireless device from a network signal tower). Thus, the management server may provide detailed information to the device agent to control the type of test, the frequency of testing, the manner in which test data is reported, etc.

Referring again to FIG. 4, once the conditions specified in the performance test command are satisfied, the wireless device may initiate the test with the target server (act 124). The performance test command may specify all the information necessary for performing the test and recording the results. Thus, once the device agent has received and accepted the performance test command, the tests may be performed whether or not the wireless device is in communication with the management server. The device agent may record the results of the tests (act 130). If the wireless device is out of range of, or disconnected from, the management server, the wireless device may store the information until such time as the wireless device may be able to communicate with the management server.

One example of a performance metric that may provide a useful indication of the service quality of a network is the number of times an attempt is made to establish a connection between the wireless device and the target server in which the connection attempt fails. Particularly, attempts by the wireless device to establish a connection cannot be measured by conventional systems that rely on network-initiated tests. A connection attempt from a wireless device may be made by any application on the wireless device. For example, a connection may be needed to download data to the wireless device. However, an attempt to establish a connection may fail due to various network conditions. For example, the target server may not be available, the requested data may not be authorized for download to the wireless device, the wireless device may have insufficient resources to accept the download, the signal strength may be insufficient to allow connection to the target server, etc. A connection attempt failure may occur during normal operation of the wireless device or during a test (a synthetic transaction) specifically performed to test network service quality.

To capture connection attempt failure information during normal operation of the wireless device, the device agent may set one or more traps to monitor connection attempts and/or connection attempt failures (act 126). In one example, connection attempt failures may be captured by device applications that are involved in the connection. Thus, traps may be set on a per application basis. In another example, connections attempts may be one of two types, namely, an attempt to connect to the wireless device from a network node, or an attempt to connect from the wireless device to a target server. Thus, different traps may also be set according to the type of attempt failure. The type of trap to be set, the conditions that are to trigger the trap, and the action to be taken upon execution of the trap may all be specified in a performance test command sent to the device agent by the management server, as discussed above. Every time a connection attempt failure occurs, the trap may be triggered (act 128).

According to one embodiment, when a connection attempt fails, the device state and/or network state may be recorded (act 130) along with an attempt-history-count counter. The attempt-history-count counter may be a software object that may record a number of times a connection attempt was made, the type of connection (to or from the wireless device) and, optionally, the times at which the attempts were made and/or the location of the device when the attempts were made). Each time a connection attempt failure is detected, the attempt-history-count counter may be incremented. The device state may include, for example, the device address (or other identifier), device battery conditions, device capabilities, network interface used, etc. The network state may include, for example, an identity of the target server, location of the wireless device relative in the network (e.g., an identity of a network cell in which the wireless device is connected, the geographic location of the wireless device, etc.), and other network conditions mentioned above. Similarly, for applications on the wireless device that are designed to receive network connections from an external node, a connection attempt failure may be recorded when a connection attempt is refused by the wireless device. Again, the state of the device and/or the network may also be recorded along with the connection attempt failure.

In one embodiment, the wireless device may also be configured to record test attempts. In other words, the wireless device may record instances in which the device agent attempts to conduct a test as per a performance test command, but the target server is unreachable. The number of test attempts may be determined only at the wireless device (i.e., the target server may be unaware that the wireless device is attempting to contact it), and thus may provide a useful service quality metric that may not be detectable by conventional methods which rely on the network as well as the wireless device.

It is to be appreciated that connection attempt failures are not the only performance metric or parameter that may be detected, measured, monitored and/or recorded in accordance with the principles of the invention. As discussed above, the system and methods according to embodiments of the invention may be applied to many different service quality metrics that can be detected by the wireless device, including signal strength, dropped calls, bit error rate, etc., as well as connection attempt failures. In another example, wireless device may monitor the type of service coverage, including, for example, whether there is available emergency service, voice and/or data service, various types of data service, and whether there is any service available whatsoever. In addition, any of these metrics may be monitored and measured by the wireless device using tests and/or traps as discussed above. Thus, a wide variety of data related to the quality of service of a wireless network may be captured by the wireless device and stored on the wireless device.

In one example, this data may be recorded on the wireless device in a performance record (act 130), the format of which may be specified in the performance test command, as discussed above. In one embodiment, the performance record may also indicate the time, network, and/or location details of when and where the test was conducted (or trap was executed). Thus, in one example, the wireless device may index the recorded test data with, for example, a location stamp indicative of a location of the wireless device and/or a local time stamp indicative of a time of detection of the network performance parameter that was the subject of the test. In one example, a counter object, such as the attempt-history-count object discussed above, may be appended to the performance record. Alternatively, it may form part of the performance record, depending on the format of the data expected by the management server.

Referring again to FIG. 4, once the information has been recorded in a performance record, the record may be provided to the management server in act 132. In one embodiment, the performance record may be sent to the management server in accordance with a policy that may be specified in the performance test command. For example, the device agent may be instructed to periodically contact the management server. In another example, the information may be provided to the management server upon request by the management server. In another example, the performance record may be sent to the management server when the attempt-history-count object reaches a certain count number, or when another threshold condition occurs. Such threshold conditions may be specified in the performance test command. As discussed above, in some embodiments, the wireless device may be configured to store the performance record until the record may be provided to the management server. Thus, any degradation in service quality, including the cause, may be captured in real time and stored on the wireless device, then communicated to the management server at a later time.

In summary, aspects and embodiments of the invention are directed to a system and methods in which a device agent and management server may cooperate to conduct performance tests with respect to a target server. The wireless device may receive a command from the management server that may include all the information needed for the wireless device to detect, monitor and record data relating to the quality of service provided by a network. Thus, the wireless device may perform tests and record service quality information, even while roaming among different networks, without needing to be connected to the management server. The wireless device may store this information and report the information to the management server when the wireless device is connected to the management server. Furthermore, because the wireless device may initiate performance tests, the wireless device may also record any connection attempt failures that may occur during the tests. In addition, the device agent may install traps to detect connection attempt failures and other performance metrics during normal operation of the wireless device, without the need for specially implemented tests. The device agent may communicate a comprehensive report of the performance data to the management server, along with attempt history and device and/or network state during performance tests or at the time of execution of a trap.

Having thus described several aspects and embodiments of the invention, modifications and/or improvements may be apparent to those skilled in the art and are intended to be part of this disclosure. It is to be appreciated that the principles of the invention may be applied to many different circumstances and many different wireless devices, not limited to the examples given herein. The above description is therefore by way of example only, and includes any modifications and improvements that may be apparent to one of skill in the art. The scope of the invention should be determined from proper construction of the appended claims and their equivalents.

What is claimed is:

1. A method of determining quality of service provided by a network to a wireless device, the method comprising acts of:
    receiving, on the wireless device, a performance test command communicated to the wireless device over the network, the performance test command identifying a performance test to be conducted by the wireless device;
    parsing the performance test command at the wireless device to determine at least one condition for which the performance test is to be conducted, and at least one network performance parameter to monitor during the performance test;
    setting, on the wireless device, at least one trap to execute in response to occurrence of the at least one condition; and
    responsive to execution of the trap, detecting, on the wireless device, the at least one network performance parameter and recording, on the wireless device, information relating to the at least one network performance parameter;
    wherein the at least one condition is a connection attempt failure, and wherein the acts of detecting and recording are performed each time an attempt to establish a connection between the wireless device and a network node of the network fails over a period of time in which the wireless device is not currently connected to the network node.

2. The method as claimed in claim 1, wherein detecting the at least one network performance parameter includes detecting a first network performance parameter of a first network, and detecting a second network performance parameter of a second network.

3. The method as claimed in claim 1, wherein the act of recording further includes recording a state of at least one of the wireless device and the network at a time when the attempt to establish the connection fails.

4. The method as claimed in claim 1, further comprising providing the information to a management server.

5. The method as claimed in claim 4, further comprising sending the performance test command from the management server to the wireless device.

6. The method as claimed in claim 5, further comprising authenticating the performance test command at the wireless device prior to parsing the performance test command.

7. The method as claimed in claim 5, wherein the act of parsing further comprises parsing the performance test command at the wireless device to determine a type of test to be conducted by the wireless device.

8. The method as claimed in claim 1, wherein detecting the at least one network performance parameter includes detecting the at least one network performance parameter during a period in which the wireless device is not connected to the network.

9. The method as claimed in claim 8, wherein the at least one network performance parameter includes a type of service coverage.

10. The method as claimed in claim 8, wherein the act of recording includes an act of indexing the information with at least one of a location stamp indicative of a location of the wireless device and a local time stamp indicative of a time of detection of the at least one network performance parameter.

11. The method of claim 1, wherein the act of recording further includes recording a number of times the attempt to establish a connection between the wireless device and the network node of the network fails.

12. A system for network service quality management, the system comprising:
a wireless device capable of establishing a connection with a target server in a network; and
a device agent constructed and arranged to interface with software on the wireless device and to detect and record, on the wireless device, performance data relating to the network;
wherein the device agent is configured to receive a performance test command identifying a performance test to be conducted by the wireless device, to parse the performance test command to determine at least one condition for which the performance test is to be conducted, the at least one condition being a connection attempt failure, and to set at least one trap to be executed in response to occurrence of the at least one condition that detects and records the performance data relating to the network each time a connection attempt fails between the wireless device and the target server over a period of time in which the wireless device is not currently connected to the target server.

13. The system as claimed in claim 12, further comprising a management server capable of communicating with the device agent.

14. The system as claimed in claim 13, wherein the management server is constructed and arranged to provide the performance test command to the device agent.

15. The system as claimed in claim 14, wherein the performance test command includes instructions identifying a record format in which the device agent is to report the performance data to the management server.

16. The system as claimed in claim 14, wherein the performance test command specifies the at least one trap to be installed on the wireless device by the device agent to detect the performance data.

17. The system as claimed in claim 14, wherein the device agent is configured to provide the performance data to the management server in accordance with a policy specified in the performance test command.

18. The system as claimed in claim 14, wherein the device agent is further constructed and arranged to authenticate the performance test command prior to conducting the test.

19. A system for service quality management in wireless networks, the system comprising:
a management server;
a wireless device capable of establishing a connection to the wireless networks; and
a device agent coupled to the wireless device and constructed and arranged to receive instructions from the management server, to parse the instructions to determine at least one condition for which a performance test is to be conducted, to set a trap to conduct the performance test on the wireless device based on the instructions and in response to occurrence of the at least one condition, to store, on the wireless device, test results from the performance test, and to provide the test results to the management server;
wherein the at least one condition being a connection attempt failure; and
wherein the test results include a state of at least one of the wireless device and the wireless networks and a number of times an attempt to establish a connection between the wireless device and a node in at least one of the wireless networks fails over a period of time in which the wireless device is not currently connected to the node in the at least one of the wireless networks.

* * * * *